United States Patent
Nakanishi et al.

(10) Patent No.: US 11,145,045 B2
(45) Date of Patent: Oct. 12, 2021

(54) IMAGE PROCESSING PROGRAM, IMAGE PROCESSING APPARATUS, AND IMAGE PROCESSING METHOD

(71) Applicant: FUJITSU LIMITED, Kawasaki (JP)

(72) Inventors: Yusuke Nakanishi, Kawasaki (JP); Hideyuki Kikuchi, Chigasaki (JP); Koichi Oikawa, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 40 days.

(21) Appl. No.: 16/416,491

(22) Filed: May 20, 2019

(65) Prior Publication Data
US 2019/0385295 A1   Dec. 19, 2019

(30) Foreign Application Priority Data
Jun. 13, 2018  (JP) .............................. JP2018-112612

(51) Int. Cl.
G06T 7/00   (2017.01)
G06T 7/35   (2017.01)
G06T 7/40   (2017.01)

(52) U.S. Cl.
CPC .............. *G06T 7/0002* (2013.01); *G06T 7/35* (2017.01); *G06T 7/40* (2013.01); *G06T 7/97* (2017.01)

(58) Field of Classification Search
CPC ........... G06T 7/0002; G06T 7/35; G06T 7/97; G06T 7/40
See application file for complete search history.

(56) References Cited

U.S. PATENT DOCUMENTS

2009/0303469 A1* 12/2009 Lee .................... G01B 11/2518
356/237.2

FOREIGN PATENT DOCUMENTS

| JP | 58-39936 | 3/1983 |
| JP | 2006-118913 | 5/2006 |
| JP | 2014-6219 | 1/2014 |

OTHER PUBLICATIONS

Nguyen et al, "A Novel Automatic Concrete Surface Crack Identification Using Isotropic Undecimated Wavelet Transform", IEEE, 2012 (Year: 2012).*
Hoang-Nam Nguyen et al., "A Novel Automatic Concrete Surface Crack Identification using Isotropic Undecimated Wavelet Transform", Intelligent Signal Processing and Communications Systems (ISPACS), 2012 International Symposium On, IEEE, Nov. 4, 2012, pp. 766-771, XP032338523.
EESR—Extended European Search Report of European Patent Application No. 19175943.0 dated Nov. 11, 2019.

* cited by examiner

*Primary Examiner* — Ruiping Li
(74) *Attorney, Agent, or Firm* — Fujitsu Patent Center

(57) ABSTRACT

An image processing method is performed by a computer, for determining that a line is a crack or something other than the crack. The method includes: extracting a linear region from an image of an object captured by an imaging apparatus; determining a luminosity change in a direction traversing the linear region at each of a plurality of positions separate in a longitudinal direction of the linear region; and identifying a type of the linear region based on the luminosity changes at the plurality of positions.

12 Claims, 11 Drawing Sheets

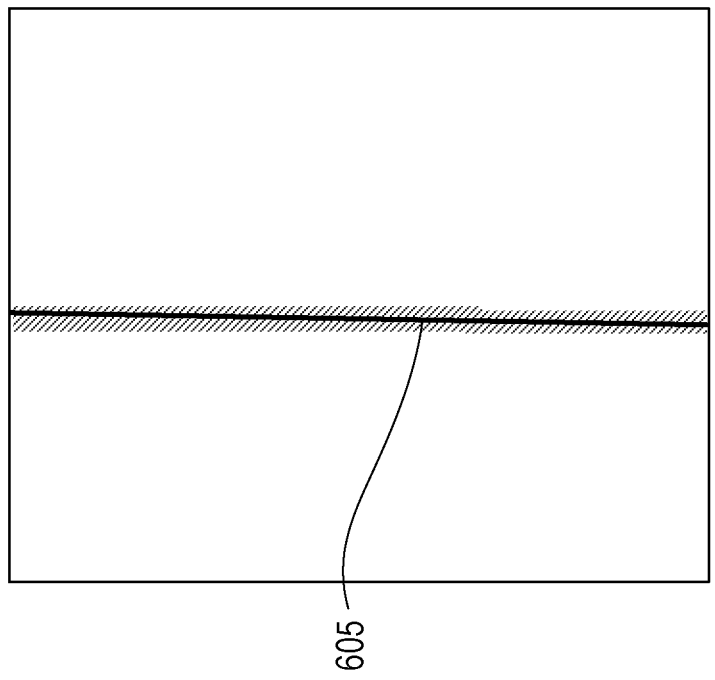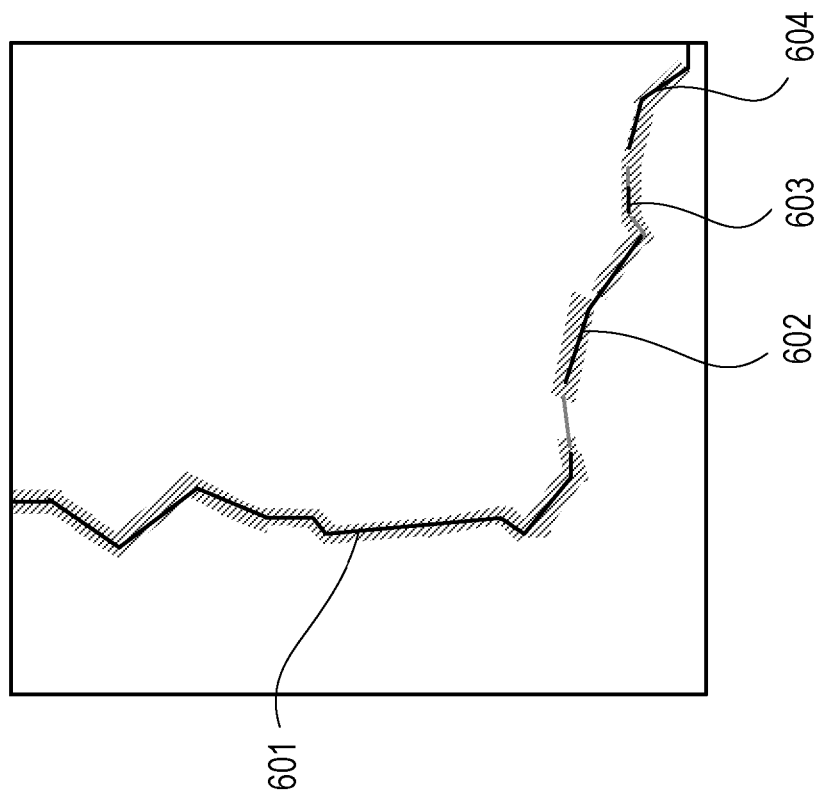

FIG. 12A

| | P1 | P2 | P3 | P4 | P5 | MEAN VALUE |
|---|---|---|---|---|---|---|
| CRACK | 41 | 35 | 45 | 33 | 32 | 37.2 |
| BLACK PEN | 42 | 44 | 34 | 40 | 41 | 40.2 |
| HAIR | 40 | 45 | 38 | 42 | 45 | 42 |

FIG. 12B

| | P1 | P2 | P3 | P4 | P5 | MEAN VALUE |
|---|---|---|---|---|---|---|
| CRACK | 56 | 64 | 62 | 58 | 72 | 62.4 |
| BLACK PEN | 60 | 59 | 78 | 66 | 63 | 65.2 |
| HAIR | 68 | 72 | 75 | 65 | 66 | 69.2 |

FIG. 13A

| BLACK LINE REGION | P11 | P12 | P13 | P14 | P15 | MEAN VALUE |
|---|---|---|---|---|---|---|
| | 38 | 45 | 41 | 40 | 42 | 41.2 |

FIG. 13B

| BLACK LINE REGION | P11 | P12 | P13 | P14 | P15 | MEAN VALUE |
|---|---|---|---|---|---|---|
| | 70 | 65 | 69 | 68 | 71 | 68.6 |

IMAGE PROCESSING PROGRAM, IMAGE PROCESSING APPARATUS, AND IMAGE PROCESSING METHOD

CROSS-REFERENCE TO RELATED APPLICATION

This application is based upon and claims the benefit of priority of the prior Japanese Patent Application No. 2018-112612, filed on Jun. 13, 2018, the entire contents of which are incorporated herein by reference.

FIELD

The embodiment discussed herein is related to an image processing program, an image processing apparatus, and an image processing method.

BACKGROUND

A crack detection device configured to detect presence or absence of a crack in a concrete wall smeared with soot or the like, and a surface defect detection device configured to detect a surface defect such as a crack or a scratch in an inspection target surface that exhibits multiple colors are known (for example, see Japanese Laid-open Patent Publication No. 2014-6219 and Japanese Laid-open Patent Publication No. 58-39936).

The crack detection device in Japanese Laid-open Patent Publication No. 2014-6219 radiates at least one of red light, blue light, and green light toward an inspection target object, and takes a picture of the inspection target object. Then, the crack detection device calculates chroma of each pixel of the obtained image from the RGB values, and determines presence or absence of a crack in a surface of the inspection target object.

However, the above technique may falsely recognize hair, a black and dirty spider web, a black line drawn with a black pen, or the like present on a concrete wall, as a crack.

The above problem occurs not only in a case of detecting a crack from the image obtained by taking a picture of the concrete wall but also in a case of identifying a type of a linear region contained in an image obtained by taking a picture of another object.

In one aspect, it is an object of the embodiment to precisely identify a type of a linear region contained in an image obtained by taking a picture of an object.

SUMMARY

According to an aspect of the embodiments, an image processing method is performed by a computer, for determining that a line is a crack or something other than the crack. The method includes: extracting a linear region from an image of an object captured by an imaging apparatus; determining a luminosity change in a direction traversing the linear region at each of a plurality of positions separate in a longitudinal direction of the linear region; and identifying a type of the linear region based on the luminosity changes at the plurality of positions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 6A and 6B are diagrams illustrating vector data;

FIGS. 12A and 12B are tables illustrating types and statistics of black line regions registered in a database;

FIGS. 13A and 13B are tables illustrating statistics of luminosity changes indicated by luminosity information.

DESCRIPTION OF EMBODIMENTS

Hereinafter, an embodiment will be described in detail with reference to the drawings.

Figure 1:
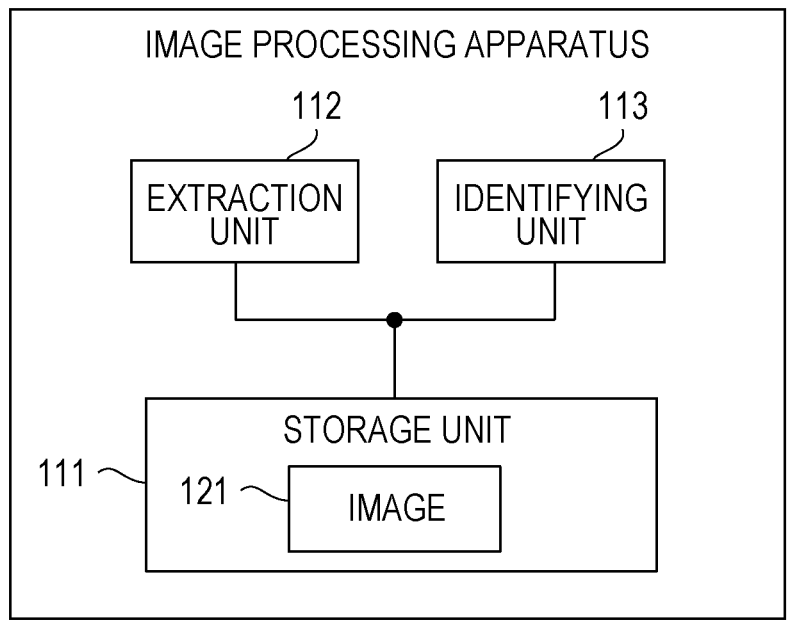
FIG. 1 is a functional configuration diagram of an image processing apparatus.

FIG. 1 illustrates a functional configuration example of an image processing apparatus of the embodiment. An image processing apparatus 101 in FIG. 1 includes a storage unit 111, an extraction unit 112, and an identifying unit 113. The storage unit 111 stores an image 121 of an object captured by an imaging apparatus. The extraction unit 112 and the identifying unit 113 perform image processing on the image 121.

Figure 2:
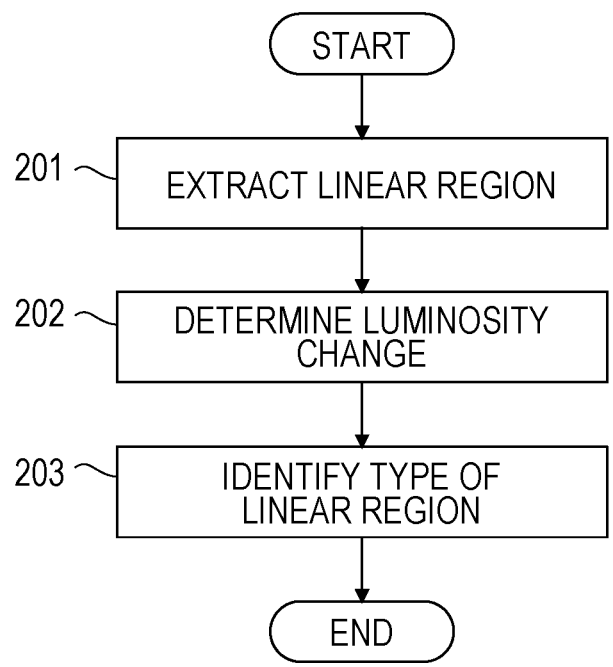
FIG. 2 is an image processing flowchart.

FIG. 2 is a flowchart illustrating an example of the image processing performed by the image processing apparatus 101 in FIG. 1. First, the extraction unit 112 extracts a linear region from the image 121 (step 201). Next, at each of a plurality of positions separate in a lengthwise direction of the linear region having been extracted by the extraction unit 112, the identifying unit 113 determines a luminosity change in a direction traversing the linear region (step 202). Then, the identifying unit 113 identifies a type of the linear region based on the luminosity changes at the plurality of positions (step 203).

According to the image processing apparatus 101 in FIG. 1, the type of a linear region contained in the image obtained by taking a picture of the object may be precisely identified.

Figure 3:
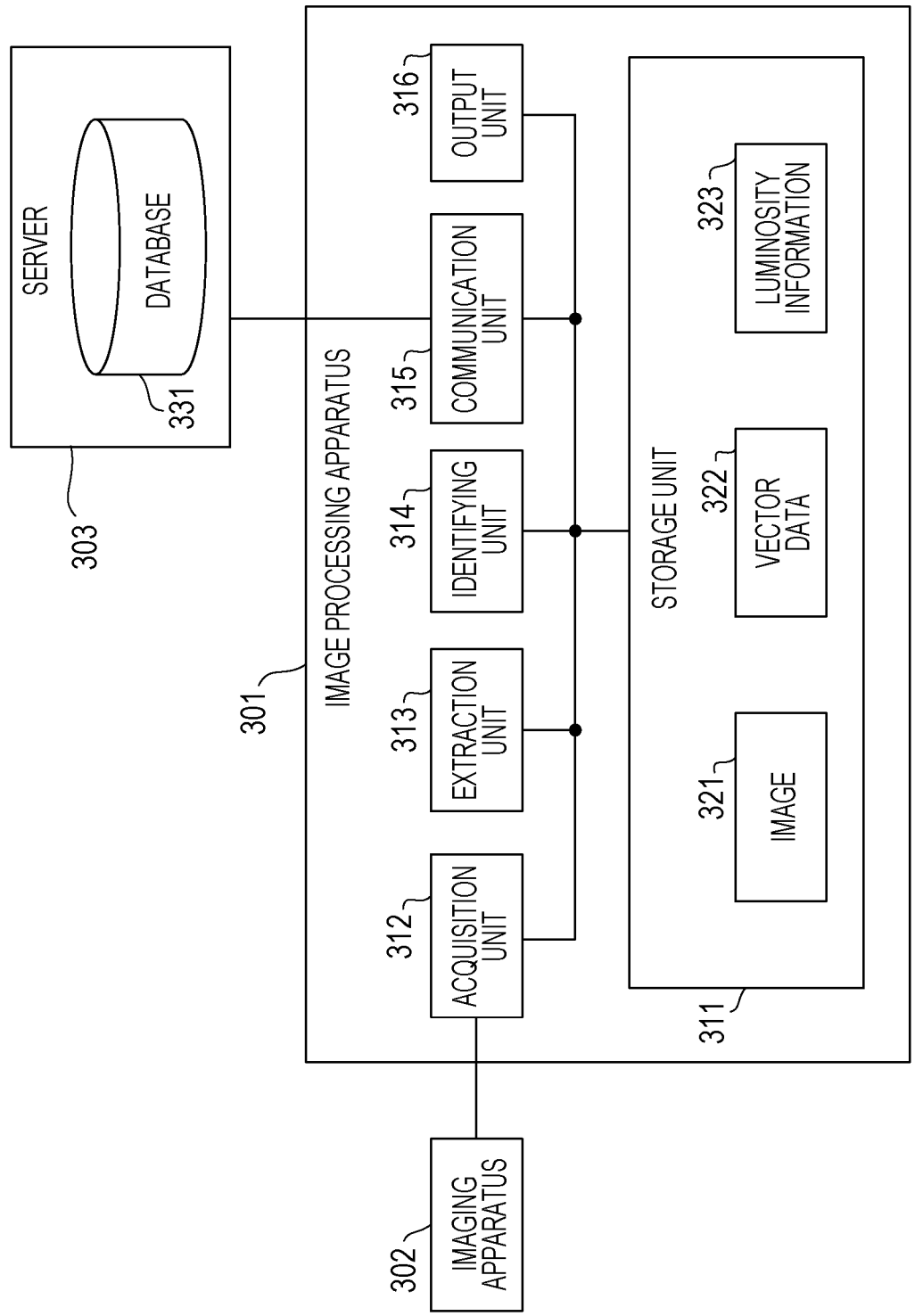
FIG. 3 is a functional configuration diagram of an image processing system.

FIG. 3 illustrates a functional configuration example of an image processing system including the image processing apparatus 101 in FIG. 1. The image processing system in FIG. 3 includes an image processing apparatus 301, an imaging apparatus 302, and a server 303.

The image processing apparatus 301 corresponds to the image processing apparatus 101 in FIG. 1, and includes a storage unit 311, an acquisition unit 312, an extraction unit 313, an identifying unit 314, a communication unit 315, and an output unit 316. The server 303 includes a database 331. The storage unit 311, the extraction unit 313, and the identifying unit 314 correspond to the storage unit 111, the extraction unit 112, and the identifying unit 113 in FIG. 1, respectively, and an image 321 corresponds to the image 121 in FIG. 1.

The imaging apparatus 302 is, for example, a camera including elements for image capturing such as a charge-coupled device (CCD) and a complementary metal-oxide-semiconductor (CMOS), and captures the image 321 of an object by taking a picture of the object irradiated with light. Then, the imaging apparatus 302 outputs the image 321 of the object to the image processing apparatus 301.

The acquisition unit 312 of the image processing apparatus 301 acquires the image 321 from the imaging apparatus 302 and stores it in the storage unit 311. The extraction unit 313 extracts a linear region from the image 321, converts the extracted linear region into vector data 322, and stores the vector data in the storage unit 311. The vector data 322 includes a plurality of line segments approximating the linear region, and each line segment is represented by two-dimensional coordinates of endpoints of both ends thereof.

The identifying unit 314 determines, using the vector data 322, a plurality of positions separate in the lengthwise direction of the linear region as luminosity change calculation targets. Then, the identifying unit 314 calculates a luminosity change in the direction traversing the linear region at each position, and stores luminosity information 323 indicating the calculated luminosity change in the storage unit 311.

In the database 331 of the server 303, statistics that indicate the luminosity changes having been calculated by the image processing apparatus 301 are registered, where the luminosity changes are respectively associated with a plurality of types of linear regions contained in the images of the object having been captured in the past.

The communication unit 315 communicates with the server 303 via a communication network to acquire the types of linear regions and the statistics associated with the types thereof from the database 331. The identifying unit 314 identifies the type of the linear region extracted from the image 321 using the luminosity information 323 stored in the storage unit 311 and the types and statistics acquired from the database 331. The output unit 316 outputs the type of the linear region identified by the identifying unit 314.

Figure 4:
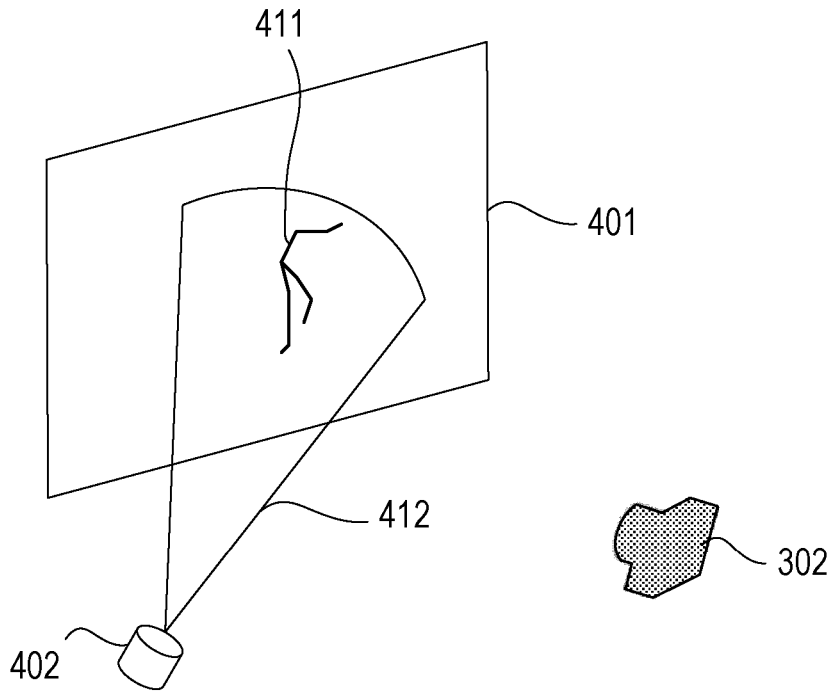
FIG. 4 is a diagram illustrating an image-capturing target object.

FIG. 4 illustrates an example of an image-capturing target object. A light source 402 radiates light 412 of a plurality of colors including red, blue, green, and the like toward a concrete wall 401, and the imaging apparatus 302 takes a picture of the concrete wall 401 irradiated with the light.

In this case, a linear region contained in the image obtained by taking a picture of the concrete wall 401 is, for example, a black line region where a crack 411, hair, a black and dirty spider web, a black line drawn with a black pen, or the like is seen. The identifying unit 314 identifies the type of the black line region extracted from the image as the crack 411 or other types than the crack 411. For example, a camera capable of image capturing of the crack 411 with a width being down to about 0.1 mm may be used, as the imaging apparatus 302.

For example, blue light is likely to be scattered in the air since its wavelength is short, and red light is unlikely to be scattered in the air since its wavelength is long. Accordingly, in a black line region other than the crack 411, luminosity distribution is significantly different between an image obtained by taking a picture of the concrete wall 401 being irradiated with blue light and an image obtained by taking a picture of the concrete wall 401 being irradiated with red light.

In contrast, in the case of the crack 411, since the reflective light becomes weak regardless of the wavelength of light, the luminosity distribution is hardly different in the black line region between when blue light is radiated and when red light is radiated. Therefore, by using images obtained by taking pictures of the object toward which light of a plurality of colors is radiated, it is possible to identify whether or not the type of the black line region is the crack 411.

Note that the image-capturing target object is not limited to the concrete wall 401, and may be an object of different material such as glass, ceramic, plastic, wood, or the like. The linear region contained in the object image is not limited to the black line region where a crack or the like is seen, and may be a region where a repairing material filled in a crack, a rope, a white line drawn with a white pen, or the like is seen.

Figure 5A:
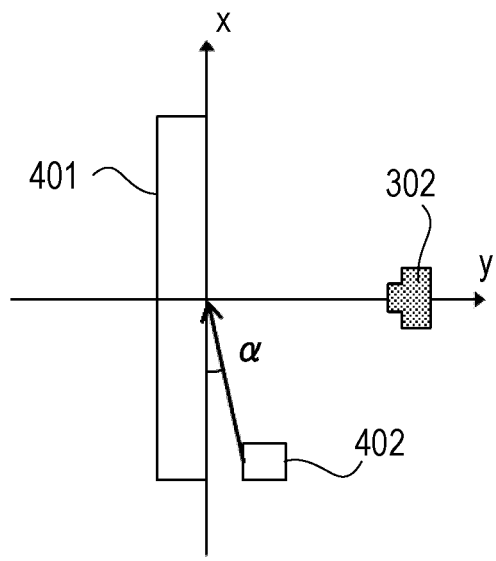
FIGS. 5A and 5B are diagrams illustrating light radiation angles.
Figure 5B:
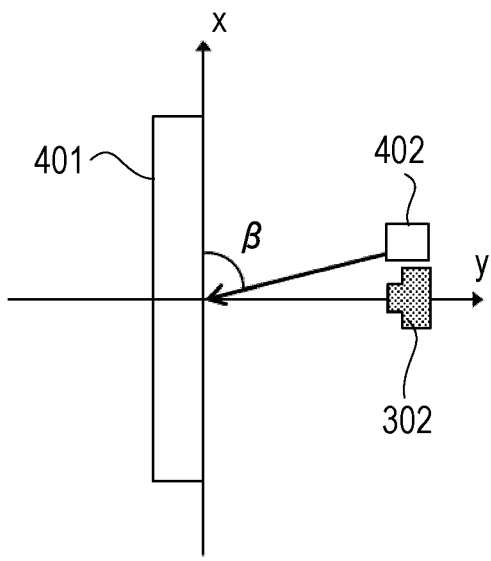

FIGS. 5A and 5B illustrate examples of radiation angles of light radiated by the light source 402. An x-axis is included in a front surface of the concrete wall 401, and a y-axis represents a direction perpendicular to the front surface of the concrete wall 401. The imaging apparatus 302 is disposed on the y-axis and takes a picture of the front surface of the concrete wall 401.

FIG. 5A illustrates an example in which the light source 402 radiates light toward the front surface of the concrete wall 401 at a small angle. As an angle α between the front surface of the concrete wall 401 and the light radiation angle, an angle in a range from 0 to 30 degrees, for example, is used.

FIG. 5B illustrates an example in which the light source 402 radiates light toward the front surface of the concrete wall 401 at a large angle. As an angle β between the front surface of the concrete wall 401 and the light radiation angle, an angle in a range from 60 to 90 degrees, for example, is used.

The light source 402 radiates the light 412 toward the concrete wall 401 at a plurality of angles, and the imaging apparatus 302 takes pictures of the concrete wall 401 irradiated with the light. For example, in a case where a three-dimensional object such as hair or a spider web is present on the concrete wall 401, as the radiation angle of the light 412 is smaller, the shadow thereof is likely to be cast and the black line region is likely to be spread. On the other hand, as the radiation angle of the light 412 is larger, the shadow is unlikely to be cast and the black line region is unlikely to be spread. Therefore, by using images obtained by taking pictures of the object toward which light is radiated at a plurality of angles, it is possible to identify whether or not the type of the black line region is a three-dimensional object.

Each of FIGS. 6A and 6B illustrates an example of the vector data 322 representing a black line region of the crack 411. FIG. 6A illustrates an example of vector data in the form of a polygonal line. Vector data 601 to vector data 604 represent four black line regions bending along a crack in the concrete wall. FIG. 6B illustrates an example of vector data in the form of a straight line. Vector data 605 represents one black line region extending along a crack in the concrete wall. Each of the vector data 601 to vector data 605 is divided into line segments at a predetermined interval.

Figure 7B:
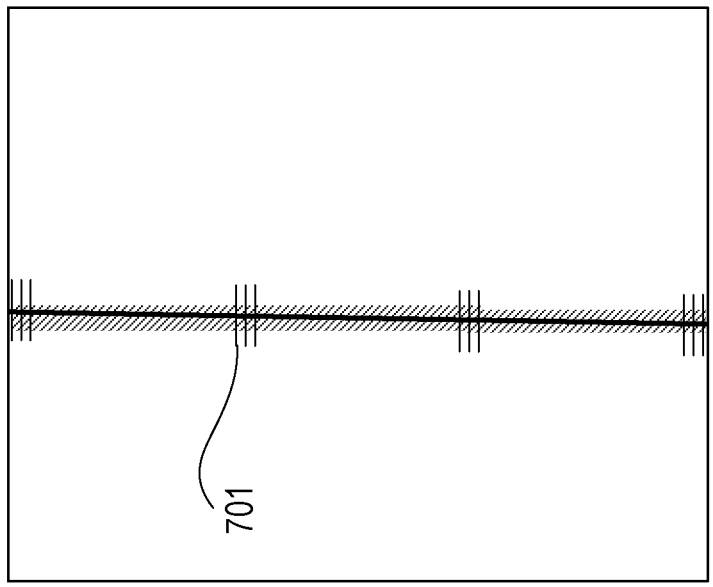
FIGS. 7A and 7B are diagrams illustrating calculation target positions.
Figure 7A:
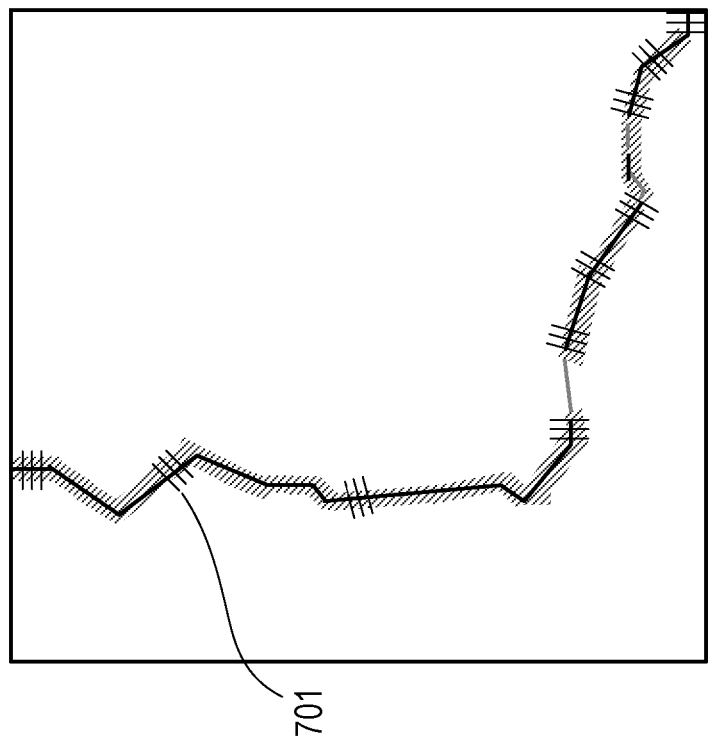

Each of FIGS. 7A and 7B illustrates an example of calculation target positions on the vector data 322. FIG. 7A illustrates an example of calculation target positions on the vector data 601 to vector data 604 in FIG. 6A, and FIG. 7B illustrates an example of calculation target positions on the vector data 605 in FIG. 6B.

Each of calculation target lines 701 in FIGS. 7A and 7B indicates a position where a luminosity change in a direction traversing the black line region of each of the vector data 601 to vector data 605 is calculated. In the case where the length of the black line region is less than a predetermined value, the calculation target lines 701 may be set in three locations, that is, at both ends and the center of the black line region.

Figure 8:
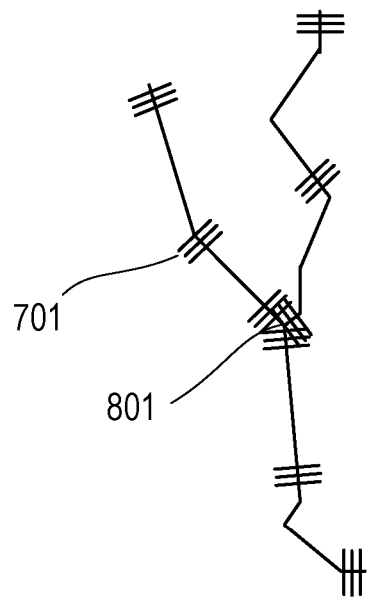
FIG. 8 is a diagram illustrating vector data including a branch.

FIG. 8 illustrates an example of the vector data 322 including a branch. In the case where the vector data branches, vector data beyond a branching point 801 is also divided into line segments at a predetermined interval for each branch.

Figure 9:
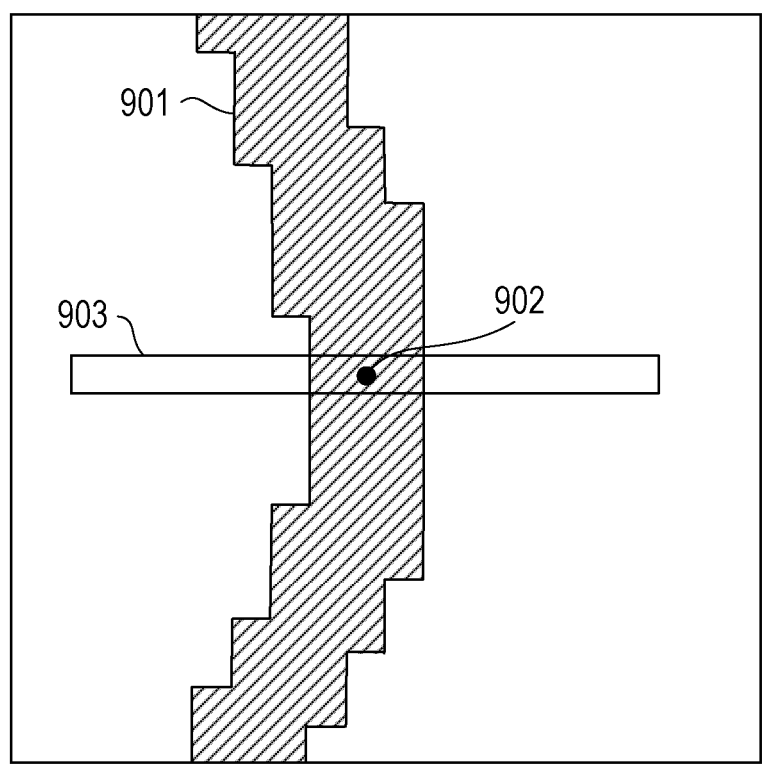
FIG. 9 is a diagram illustrating a calculation target region.

FIG. 9 illustrates an example of a calculation target region at a calculation target position. A calculation target region 903 is set in a direction traversing a black line region 901 at a calculation target position 902 of the black line region 901. The calculation target region 903 may be set in a direction orthogonal to the line segment of the vector data at the calculation target position 902. It is desirable for the length of the calculation target region 903 to be three times or more of the width of the black line region 901. In the example of FIG. 9, the width of the black line region 901 is configured of three pixels, and the length of the calculation target region 903 is configured of 15 pixels.

FIGS. 10A to 10F illustrate examples of the luminosity information 323 indicating luminosity changes in the calculation target regions. A horizontal axis represents positions of pixels included in the calculation target region traversing the black line region, and a longitudinal axis represents luminosity of the pixels at the respective positions.

Figure 10C:
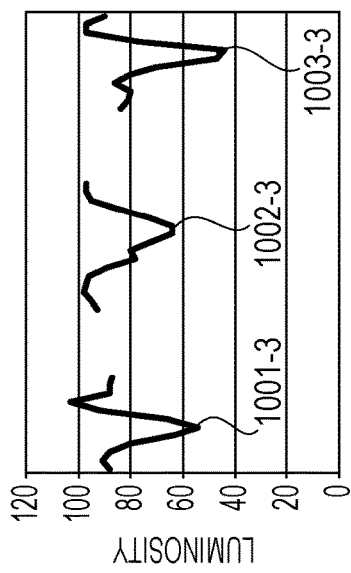
FIGS. 10A to 10F are graphs illustrating luminosity information.
Figure 10B:
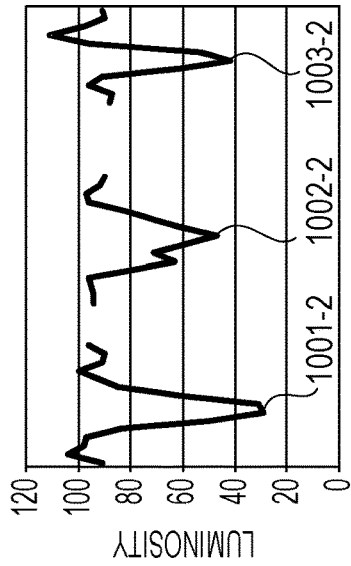
Figure 10A:
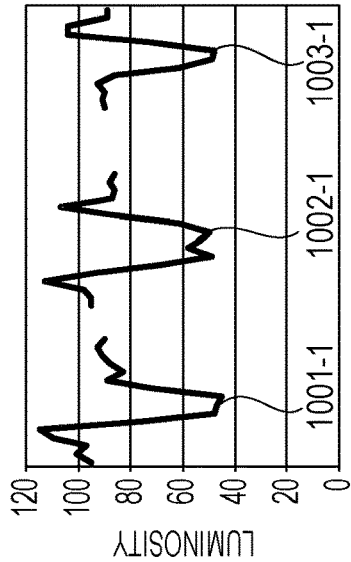
Figure 10F:
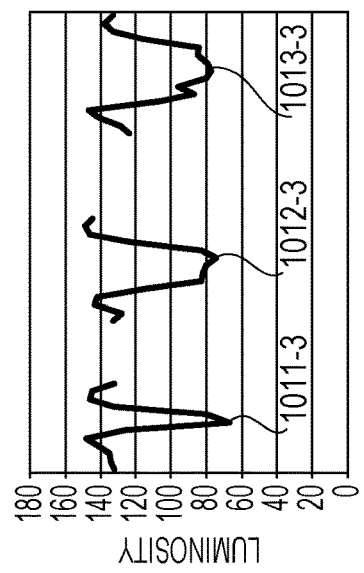
Figure 10E:
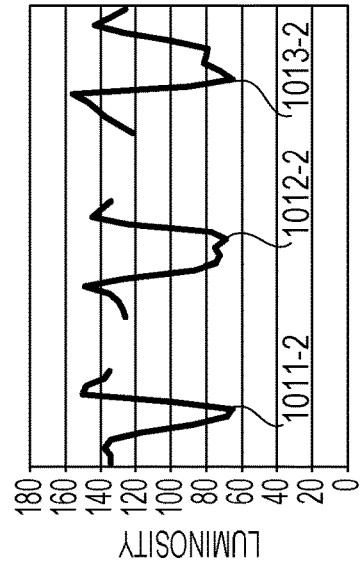
Figure 10D:
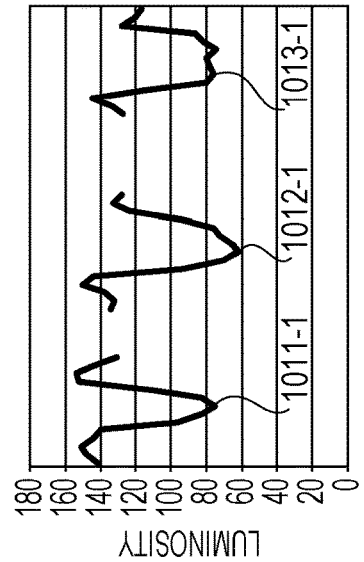

FIGS. 10A to 10C illustrate luminosity changes of an image B captured while blue light being radiated toward the concrete wall at a large angel as illustrated in FIG. 5B. FIGS. 10D to 10F illustrate luminosity changes of an image R captured while red light being radiated toward the concrete wall at a small angel as illustrated in FIG. 5A.

Graphs 1001-1 to 1003-1 in FIG. 10A and graphs 1011-1 to 1013-1 in FIG. 10D indicate the luminosity changes at the first calculation target position among the calculation target positions set in a total of three locations. Graphs 1001-2 to 1003-2 in FIG. 10B and graphs 1011-2 to 1013-2 in FIG. 10E indicate the luminosity changes at the second calculation target position. Graphs 1001-3 to 1003-3 in FIG. 10C and graphs 1011-3 to 1013-3 in FIG. 10F indicate the luminosity changes at the third calculation target position.

The graph 1001-$i$ and the graph 1011-$i$ (where i=1 to 3) indicate the luminosity changes at the i-th calculation target position in a case where the type of the black line region is a crack. The graph 1002-$i$ and the graph 1012-$i$ indicate the luminosity changes at the i-th calculation target position in a case where the type of the black line region is a black line drawn with a black pen. The graph 1003-$i$ and the graph 1013-$i$ indicate the luminosity changes at the i-th calculation target position in a case where the type of the black line region is hair.

In the case of the image R, since red light having a long wavelength is radiated, the luminosity of pixels where a crack with a width of equal to or smaller than approximately 0.2 mm is seen becomes substantially equal to the luminosity of pixels where a black pen line or hair is seen, due to the reflective light from the concrete in the vicinity of the crack. On the other hand, in the case of the image B, since blue light having a short wavelength is radiated, the luminosity of pixels where the crack is seen becomes smaller than the luminosity of pixels where the black pen line or the hair is seen.

In the case of a crack, since the luminosity is smallest at the deepest portion, the luminosity change in a width direction of the crack has only a minimum value and does not have any extreme value (a maximal value or a minimal value) other than the minimum value. On the other hand, in the case of a black pen or hair, the luminosity variously changes depending on ink fading or unevenness of the hair, and the luminosity change tends to have an extreme value other than a minimum value. For example, the luminosity has a maximal value in an ink fading portion of the black pen or in a portion where the reflective light from the hair is intensive.

Accordingly, in a case where the luminosity change does not have any extreme value other than the minimum value at any of the calculation target positions set in the three locations for the image R and the image B, it is highly possible that the black line region is a crack. In the case of hair, a portion where the luminosity is small (a dark portion) is likely to be spread due to a shadow thereof being cast.

For example, since the graphs 1002-1 to 1002-3, the graph 1012-2, and the graph 1012-3 have maximal values, the type of the black line region corresponding to these graphs may be determined to be a type other than a crack. Likewise, since the graphs 1013-1 to 1013-3 also have maximal values, the type of the black line region corresponding to these graphs may also be determined to be a type other than a crack.

In addition, since a portion where the luminosity is small in the graph 1013-$i$ is more spread than a portion where the luminosity is small in the graph 1003-$i$, the type of the black line region corresponding to these graphs may be determined to be a type other than a crack.

The number of locations in which the calculation target positions are set is not limited to three; that is, the type of a black line region may be determined by using luminosity changes at a plurality of calculation target positions set in two or more locations. As the number of calculation target positions is larger, the precision of the determination result is improved.

Figure 11:
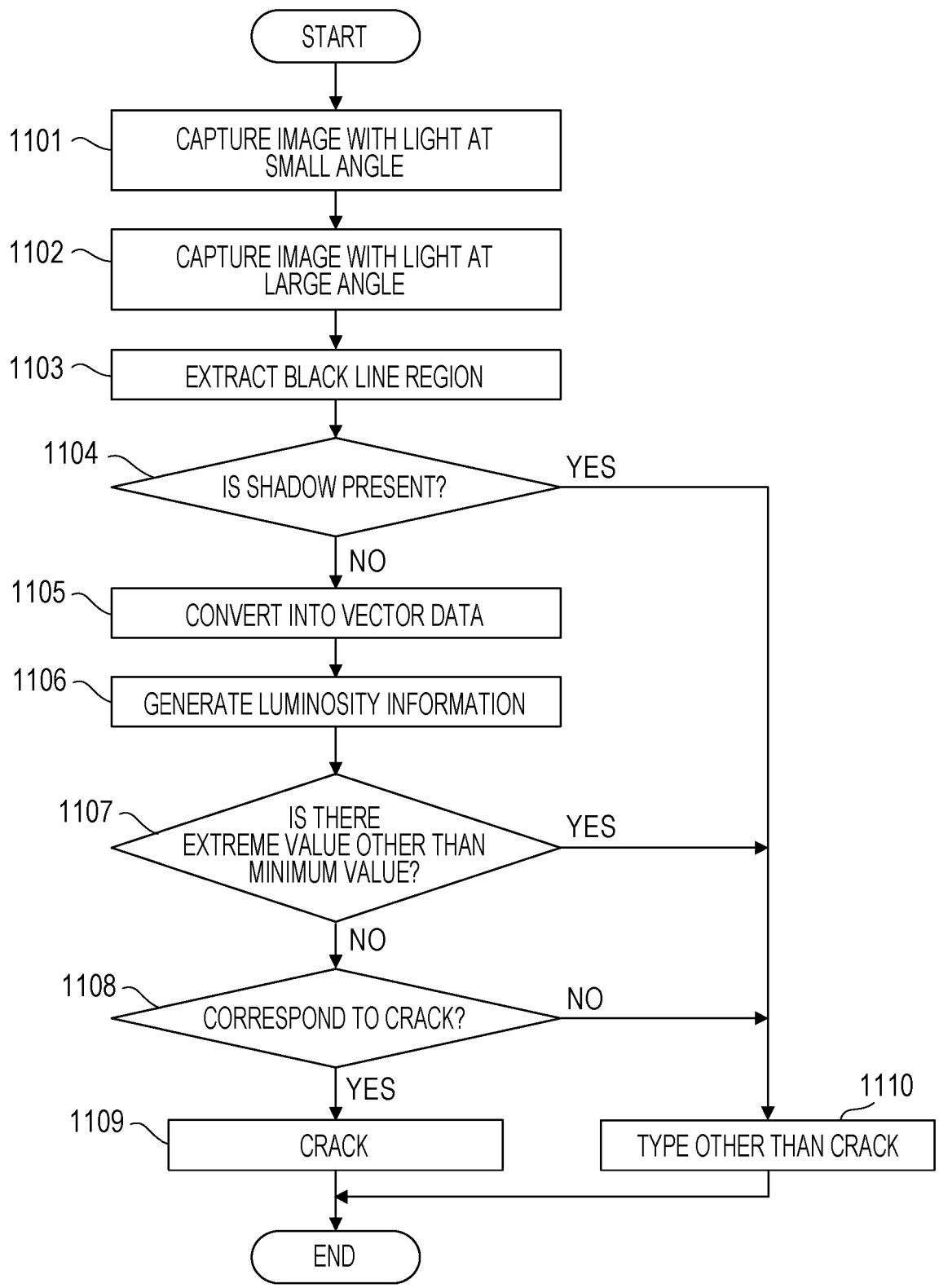
FIG. 11 is a flowchart illustrating a specific example of image processing.

FIG. 11 is a flowchart illustrating a specific example of image processing performed by the image processing system in FIG. 3. First, the light source 402 radiates light of a plurality of colors toward the concrete wall 401 at a small angle, and the imaging apparatus 302 captures the images 321 of the concrete wall 401 irradiated with the light of the plurality of colors without using the flash (step 1101).

Next, the light source 402 radiates light of a plurality of colors toward the concrete wall 401 at a large angle, and the imaging apparatus 302 captures the image 321 of the concrete wall 401 irradiated with the light of the plurality of colors without using the flash (step 1102).

Subsequently, the extraction unit 313 extracts a black linear region contained in each of a plurality of captured images 321 as a black line region (step 1103). Then, the identifying unit 314 checks whether or not a shadow is contained in the extracted black line regions by comparing the widths of the black line regions extracted from the plurality of images 321 with each other (step 1104).

For example, the identifying unit 314 superposes a black line region of the image R and a black line region of the image B, and determines that a shadow is not contained in these black line regions when the widths of both the black line regions match each other. When the width of one of the black line regions is thicker than the width of the other one of the black line regions, the identifying unit 314 determines that a shadow is contained in the thicker black line region. Thus, based on presence or absence of a shadow, it is possible to identify whether or not the type of the black line region is a three-dimensional object.

In a case where a shadow is contained in the black line region (step 1104, YES), the identifying unit 314 determines the type of the black line region as a type other than a crack (step 1110), and the output unit 316 outputs the determined type of the black line region.

On the other hand, in a case where a shadow is not contained in the black line region (step 1104, NO), the extraction unit 313 converts the black line region into the vector data 322 (step 1105).

Next, the identifying unit 314 determines a plurality of calculation target positions on the vector data 322 of each image 321, and sets a calculation target region at each calculation target position. Subsequently, the identifying unit 314 generates the luminosity information 323 indicating a luminosity change in each of the calculation target regions (step 1106), and checks whether or not the luminosity change includes an extreme value other than the minimum value (step 1107).

In a case where the luminosity change includes an extreme value other than the minimum value (step 1107, YES), the identifying unit 314 determines the type of the black line region as a type other than a crack (step 1110), and the output unit 316 outputs the determined type of the black line region.

On the other hand, in a case where the luminosity change does not include an extreme value other than the minimum value (step 1107, NO), the identifying unit 314 acquires the type and statistics of the black line region from the database 331 via the communication unit 315. Subsequently, the identifying unit 314 determines whether or not the luminosity change indicated by the luminosity information 323 corresponds to a crack, using the type and statistics acquired from the database 331 (step 1108).

For example, the identifying unit 314 calculates statistics of the luminosity change indicated by the luminosity information 323, and compares the calculated statistics with the statistics acquired from the database 331, thereby determining whether or not the luminosity change corresponds to a crack. As the statistics of the luminosity change, a maximum value, a minimum value, a median value, a mean value, and the like of the luminosity in the calculation target region may be used.

In a case where the luminosity change corresponds to a crack (step 1108, YES), the identifying unit 314 determines the type of the black line region as a crack (step 1109), and the output unit 316 outputs the determined type of the black line region. On the other hand, in a case where the luminosity change does not correspond to a crack (step 1108, NO), the identifying unit 314 determines the type of the black line region as a type other than a crack (step 1110), and the output unit 316 outputs the determined type of the black line region.

FIGS. 12A and 12B each illustrate an example of types and statistics of black line regions registered in the database 331. Note that "crack", "black pen", and "hair" indicate types of a black line region, and "P1" to "P5" indicate calculation target positions on the black line region. Each numeral in a column indicated by the calculation target position Pj (where j=1 to 5) represents a minimum value of the luminosity change at the calculation target position Pj on the black line region of the type indicated by the corresponding line. Each numeral in the column indicated by "mean value" represents a mean value of five minimum values at the calculation target positions P1 to P5.

FIG. 12A illustrates an example of minimum values and mean values calculated from images captured while blue light being radiated toward a concrete wall at a large angel. FIG. 12B illustrates an example of minimum values and mean values calculated from images captured while red light being radiated toward a concrete wall at a small angel.

In a case of using any condition of FIG. 12A or FIG. 12B, minimum values and mean values of the luminosity differ among the crack, the black pen, and the hair. Accordingly, in a case where a picture of another concrete wall is taken under the same condition, minimum values and mean values of luminosity may take similar values as long as the type of the black line region is the same.

FIGS. 13A and 13B each illustrate an example of statistics of luminosity changes indicated by the luminosity information 323. "P11" to "P15" represent calculation target positions on a black line region. A numeral at each of the calculation target positions represents a minimum value of the luminosity change at each of the calculation target positions, and "mean value" represents a mean value of five minimum values at the calculation target positions P11 to P15.

FIG. 13A illustrates an example of minimum values and a mean value calculated from an image captured while blue light being radiated toward a concrete wall at a large angel. FIG. 13B illustrates an example of minimum values and a mean value calculated from an image captured while red light being radiated toward a concrete wall at a small angel.

For example, when a mean value of any of the types in FIG. 12A or 12B is taken as "A", in a case where a mean value in FIG. 13A or 13B falls within a range from A−Δ to A+Δ, the identifying unit 314 may determine that the luminosity change indicated by the luminosity information 323 corresponds to the above-mentioned type.

When Δ=1, a range R1 of the mean value corresponding to the crack in FIG. 12A is 36.2 to 38.2, a range R2 of the mean value corresponding to the black pen in FIG. 12A is 39.2 to 41.2, and a range R3 of the mean value corresponding to the hair in FIG. 12A is 41 to 43. Further, a range R4 of the mean value corresponding to the crack in FIG. 12B is 61.4 to 63.4, a range R5 of the mean value corresponding to the black pen in FIG. 12B is 64.2 to 66.2, and a range R6 of the mean value corresponding to the hair in FIG. 12B is 68.2 to 70.2.

The mean value 41.2 in FIG. 13A is not included in the range R1 of the crack in FIG. 12A, but is included in the range R2 of the black pen and the range R3 of the hair in FIG. 12A. Accordingly, it may be determined that the type of the black line region in FIG. 13A is either the black pen or the hair. Further, the mean value 68.6 in FIG. 13B is not included in any of the range R4 of the crack and the range R5 of the black pen in FIG. 12B, but is included in the range R6 of the hair in FIG. 12B. Accordingly, the type of the black line region in FIG. 13B is determined to be hair.

As discussed above, by comparing the statistics of the luminosity change indicated by the luminosity information 323 with the statistics acquired from the database 331, it is possible to improve the precision of determination on the type of the black line region. As the number of images captured under different conditions in colors of light or angles of light radiated toward the same concrete wall is increased, the precision of the determination is improved.

The identifying unit 314 may register the calculated statistics of the luminosity changes in the database 331 in which the calculated statistics are associated with the type of the black line region having been confirmed by an operator at the inspection site, and may use the registered statistics in the next image processing.

According to the image processing in FIG. 11, since the type of the black line region contained in the image of the concrete wall is automatically identified, the inspection of the concrete wall is efficiently carried out by the operator. For example, even if hair, a black and dirty spider web, a black line drawn with a black pen, or the like is present on the concrete wall, such matter may be distinguished from a crack.

Note that, in step 1104, instead of checking the presence or absence of a shadow by comparing the widths of the black line regions of the plurality of images 321, it is also possible to check the presence or absence of a shadow by comparing the luminosity changes at the same calculation target position of the plurality of images 321. In this case, the identifying unit 314 determines a width of a region having a smaller luminosity than a predetermined value from the luminosity changes at the same calculation target position of the plurality of images 321. Then, in a case where a difference in width between the regions of two images 321 is greater than a threshold, the identifying unit 314 determines that a shadow is contained in the region having a wider width.

The configuration of the image processing apparatus 101 in FIG. 1 is merely an example, and part of the constituent elements may be omitted or modified in accordance with usage or conditions of the image processing apparatus 101.

The configuration of the image processing system in FIG. 3 is merely an example, and part of the constituent elements may be omitted or modified in accordance with usage or conditions of the image processing apparatus 301. For example, in a case where the image 321 is stored beforehand in the storage unit 311, the acquisition unit 312 may be omitted, and in a case where the database 331 is not used, the communication unit 315 may be omitted. In a case where it is not required to output the type of a linear region, the output unit 316 may be omitted.

The flowcharts in FIGS. 2 and 11 are merely examples, and part of the processing may be omitted or modified in accordance with the configuration or conditions of the image processing apparatus. For example, in the image processing of FIG. 11, in the case where the image 321 is stored beforehand in the storage unit 311, the processing in step 1101 and the processing in step 1102 may be omitted. In a case where it is not required to check the presence or absence of a shadow, the processing in step 1104 may be omitted, and in the case where the database 331 is not used, the processing in step 1108 may be omitted.

The concrete wall 401 illustrated in FIG. 4 is merely an example, and the image-capturing target object may be an object made of another material. The light radiation angles illustrated in FIGS. 5A and 5B are merely examples, and other radiation angles may be employed in accordance with the configuration or conditions of the image processing apparatus. The black line regions, vector data, and calculation target lines illustrated in FIG. 6A to FIG. 8 are merely examples, and the black line regions, vector data, and calculation target lines vary in accordance with the image 321.

The calculation target region 903 illustrated in FIG. 9 is merely an example, and a calculation target region of another shape or another size may be employed in accordance with the configuration or conditions of the image processing apparatus. The calculation target region 903 may not be orthogonal to a line segment of vector data. The luminosity information 323 illustrated in FIGS. 10A to 10F is exemplary, and the luminosity information 323 varies in accordance with the image 321.

The minimum values and mean values illustrated in FIG. 12A to FIG. 13B are merely examples, and the statistics of luminosity changes vary in accordance with the luminosity changes at the respective calculation target positions.

Figure 14:
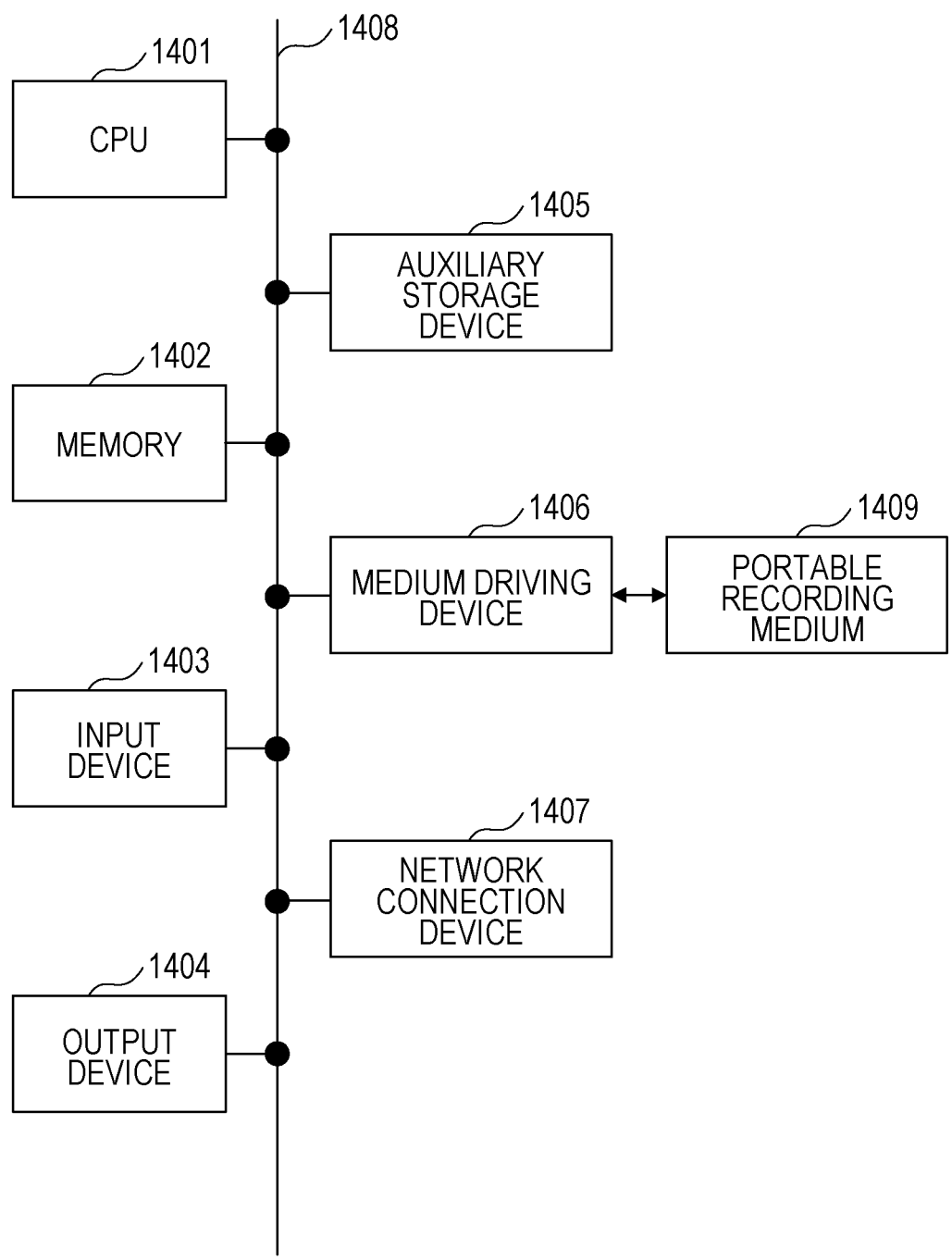
FIG. 14 is a configuration diagram of an information processing apparatus.

FIG. 14 illustrates a configuration example of an information processing apparatus (computer) used as the image processing apparatus 101 in FIG. 1 and the image processing apparatus 301 in FIG. 3. The information processing apparatus in FIG. 14 includes a central processing unit (CPU) 1401, a memory 1402, an input device 1403, an output device 1404, an auxiliary storage device 1405, a medium driving device 1406, and a network connection device 1407. These constituent elements are connected to one another through a bus 1408. The imaging apparatus 302 in FIG. 3 may be connected to the bus 1408.

The memory 1402 is, for example, a semiconductor memory such as a read only memory (ROM), a random access memory (RAM) or a flash memory, and stores therein programs and data used in the processing. The memory 1402 may be used as the storage unit 111 in FIG. 1 and the storage unit 311 in FIG. 3.

The CPU 1401 (processor) operates as the extraction unit 112 and the identifying unit 113 in FIG. 1 by executing a program while using the memory 1402. The CPU 1401 also operates as the acquisition unit 312, the extraction unit 313, and the identifying unit 314 in FIG. 3 by executing the program while using the memory 1402.

The input device 1403 is, for example, a keyboard or a pointing device, and is used for inputting a command or information from an operator or a user. The output device 1404 is, for example, a display device, a printer, a speaker, or the like and is used for outputting an inquiry or a command, and a result of processing to be given to the operator or user. The output device 1404 may be used as the output unit 316 in FIG. 3. The result of processing may be information indicating types of linear regions.

The auxiliary storage device 1405 is, for example, a magnetic disk drive, an optical disk drive, a magneto-optical disk drive, a tape drive, or the like. The auxiliary storage device 1405 may be a hard disk drive or a flash memory. The information processing apparatus may store programs and data in the auxiliary storage device 1405, and use these programs and data by loading them on the memory 1402. The auxiliary storage device 1405 may be used as the storage unit 111 in FIG. 1 and the storage unit 311 in FIG. 3.

The medium driving device 1406 drives a portable recording medium 1409, and accesses its recording contents. The portable recording medium 1409 is a memory device, a flexible disk, an optical disk, a magneto-optical disk, or the like. The portable recording medium 1409 may be a compact disk read only memory (CD-ROM), a digital versatile disk (DVD), a Universal Serial Bus (USB) memory, or the like. An operator or a user may beforehand store programs and data in the portable recording medium 1409, and use these programs and data by loading them on the memory 1402.

As described above, a computer-readable recording medium configured to store programs and data used in the processing is a physical (non-transitory) recording medium like the memory 1402, the auxiliary storage device 1405, or the portable recording medium 1409.

The network connection device 1407 is connected to a communication network such as a local area network (LAN) or a wide area network (WAN), and is a communication interface circuit configured to perform data conversion required for the communication. The information processing apparatus may receive programs and data from external devices via the network connection device 1407, and load these programs and data on the memory 1402 to use them. The network connection device 1407 may be used as the communication unit 315 in FIG. 3.

Not all of the constituent elements in FIG. 14 are required to be included in the information processing apparatus, and part of the constituent elements may be omitted in accordance with the usage or conditions of the apparatus. For example, in a case where it is not required to interact with an operator or a user, the input device 1403 and the output device 1404 may be omitted. In a case where the portable recording medium 1409 or the communication network is not used, the medium driving device 1406 or the network connection device 1407 may be omitted.

As the server 303 in FIG. 3, the same information processing apparatus as that in FIG. 14 may be used. In this case, the auxiliary storage device 1405 is used as the database 331.

The disclosed embodiment and its advantages have been described in detail thus far, and it would be possible for those skilled in the art to carry out various kinds of modification, addition, and omission without departing from the spirit and scope of the embodiment as set forth clearly in the appended claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium having stored therein a program for causing a computer to execute a process for image processing, the process comprising:
   extracting a linear region from each of a plurality of images of an object captured by an imaging apparatus, wherein the plurality of images are captured while light of different colors is respectively radiated toward the object;
   determining a luminosity change in a direction traversing the linear region at each of a plurality of positions separate in a longitudinal direction of the linear region of each of the plurality of images of the different colors; and
   identifying a type of the linear region based on a comparison between the luminosity changes of the different colors at each of the plurality of positions of the linear regions extracted from the plurality of images.

2. The non-transitory computer-readable storage medium according to claim 1, wherein
   in the identifying, the type of the linear region is identified based on whether or not an extreme value other than a minimum value of luminosity is present in any of the luminosity changes at the plurality of positions.

3. The non-transitory computer-readable storage medium according to claim 1, wherein
   in the extracting, extracted is a linear region from each of a plurality of images captured while light being radiated respectively at a plurality of angles toward the object;
   in the determining of the luminosity change, determined is a luminosity change in a direction traversing each of the linear regions with respect to the linear regions of the plurality of images; and
   in the identifying, the type of the linear region is identified based on luminosity changes at a plurality of positions of the linear regions extracted from the plurality of images.

4. The non-transitory computer-readable storage medium according to claim 3, wherein
   in the identifying, the type of the linear region is identified based on a comparison result obtained by comparing widths of the linear regions extracted from the plurality of images.

5. The non-transitory computer-readable storage medium according to claim 3, wherein
   in the identifying, the type of the linear region is identified based on a comparison result obtained by comparing luminosity changes at a same position of the linear regions extracted from the plurality of images.

6. The non-transitory computer-readable storage medium according to claim 1, the process further comprising:
   processing in which first statistics indicating luminosity changes at a plurality of positions of linear regions and registered being associated with a plurality of types are acquired, the acquired first statistics are compared with second statistics indicating luminosity changes at a plurality of positions of the linear regions extracted from the plurality of images, and the type of the linear region is determined based on a comparison result obtained by comparing the first statistics and the second statistics.

7. The non-transitory computer-readable storage medium according to claim 1, wherein
   the object is a concrete wall, and the types of the linear regions are a crack and a type other than the crack.

8. An image processing apparatus comprising:
   a memory storing an image of an object captured by an imaging apparatus; and
   a processor coupled to the memory and configured to execute a process including:
   extracting a linear region from each of a plurality of images of an object captured by an imaging apparatus, wherein the plurality of images are captured while light of different colors is respectively radiated toward the object;
   determining a luminosity change in a direction traversing the linear region at each of a plurality of positions separate in a longitudinal direction of the linear region of each of the plurality of images of the different colors; and
   identifying a type of the linear region based on a comparison between the luminosity changes of the different colors at each of the plurality of positions of the linear regions extracted from the plurality of images.

9. The image processing apparatus according to claim 8, wherein
   in the identifying, the type of the linear region is identified based on whether or not an extreme value other than a minimum value of luminosity is present in any of the luminosity changes at the plurality of positions.

10. The image processing apparatus according to claim 8, wherein
- in the extracting, extracted is a linear region from each of a plurality of images captured while light being radiated respectively at a plurality of angles toward the object;
- in the determining of the luminosity change, determined is a luminosity change in a direction traversing each of the linear regions with respect to the linear regions of the plurality of images; and
- in the identifying, the type of the linear region is identified based on luminosity changes at a plurality of positions of the linear regions extracted from the plurality of images.

11. An image processing method performed by a computer, the method comprising:
- extracting a linear region from each of a plurality of images of an object captured by an imaging apparatus, wherein the plurality of images are captured while light of different colors is respectively radiated toward the object;
- determining a luminosity change in a direction traversing the linear region at each of a plurality of positions separate in a longitudinal direction of the linear region of each of the plurality of images of the different colors; and
- identifying a type of the linear region based on a comparison between the luminosity changes of the different colors at each of the plurality of positions of the linear regions extracted from the plurality of images.

12. The image processing method according to claim 11, wherein
- in the identifying, the type of the linear region is identified based on whether or not an extreme value other than a minimum value of luminosity is present in any of the luminosity changes at the plurality of positions.

\* \* \* \* \*